March 14, 1967 SHIGERU TSUJI ETAL 3,308,525
METHOD OF GLASS GLAZING
Filed June 14, 1963

INVENTORS
SHIGERU TSUJI
KAZUTAMI HAYASHI
BY KOUICHI KADOWAKI
KATSUO SATO
OSTROLENK, FABER, GERB & SOFFEN
ATTORNEYS 3,308,525
METHOD OF GLASS GLAZING
Shigeru Tsuji, Kazutami Hayashi, Koichi Kadowaki, and Katsuo Sato, Minatoku, Tokyo, Japan, assignors to Nippon Electric Company Limited, Tokyo, Japan
Filed June 14, 1963, Ser. No. 287,863
Claims priority, application Japan, June 16, 1962, 37/25,188
5 Claims. (Cl. 29—155.5)

This invention relates to glass glazing and, more particularly, to an improved method of glass glazing to hermetically seal devices such as semiconductors, transistors and the like.

There presently exists a variety of methods for glass glazing. One typical method is that of mixing glass powder into a binder to form a suspension. The suspension is then coated on the portion to be glazed, such as a body portion of metal or ceramic material. The body portion is then heated so as to vitrify the suspension. Another method is comprised of dipping the portion of a member to be glazed into a mass of molten glass to effect the glazing operation. Still another method is comprised of placing a glass tablet on the portion of the member to be glazed and then heating both the member and the tablet so as to melt the glass tablet. All of the above methods necessitate complicated operations and a considerable amount of difficulty is experienced in obtaining uniformly glazed products.

The instant invention teaches a method which is simple in operation and which provides a glazed member having the desired uniformity, strength and reliability.

The method of the instant invention is comprised of placing powdered glass upon a surface whereby the powdered glass is spread in such a manner as to have a uniform thickness over said surface. Let it be assumed that the glazing method is to be performed to hermetically seal a device within a housing or container wherein said container is comprised of an open-ended housing and a lid member therefor.

Said open-ended housing is preheated to a pretermined temperature level. The heated open-ended housing is then brough into contact with said powdered glass with a predetermined force or pressure being exerted upon said housing which in turn exerts said force or pressure upon the powdered glass. This operation provides a glass coating of a uniform thickness over the surface of said open-ended housing which comes into contact with said powdered glass.

A lid member undergoes a like operation wherein said member is brought into pressure contact of a predetermined magnitude with powdered glass arranged on a surface so as to provide a glass coating of a uniform thickness around the peripheral portion of said lid which portion normally engages the surface of said open-ended housing.

With both said open-ended housing and said lid member being so treated, the device to be enclosed within said housing is placed therein, and said open-ended housing and said lid are then brought into engagement with one another. Said open-ended housing and said lid member are then heated to a predetermined temperature level in order to fuse the engaging glazed portions so as to provide a hermetic seal therebetween.

In applications where it is desired to house devices such as semiconductors or transistors, such devices are placed upon either said lid or said open-ended housing in such a manner that the electric leads extending therefrom project beyond the outer surface of the sealed housing. Said open-ended housing and said lid member are then heated in the same manner as previously described so as to hermetically seal the transistor or semiconductor device within said sealed housing. The glazed portions on the surface of said open-ended housing and said lid member, in addition to fusing together, further provide an excellent hermetic seal around the electrical leads extending from said sealed housing. The method outlined above can be simply and readily carried out and acts to provide an excellent hermetic seal for the above application and can further be employed in a variety of other applications depending only upon the needs of the user.

It is therefore one object of the instant invention to provide a novel method for glass glazing which may be simply and readily performed.

Another object of the instant invention is to provide a novel method for glass glazing which may be simply performed and which provides a uniform glass coating on the surface of the body so treated.

Still another object is to provide a novel method for glass glazing the surface portion of a body which method is well suited for glazing metallic or ceramic containers.

Still another object is to provide a novel method for glass glazing the surface portion of a body to provide a hermetic seal therefore.

Another object is to provide a novel method for glass glazing a ceramic or metallic container member for housing a semiconductor device and the like so as to hermetically seal such a device in a container.

Still another object is to provide a novel method for glass glazing the surface of a body which method is comprised of preheating said body and bringing said body into a pressure contact with glass powder disposed on a flat base plate.

Still another object is to provide a novel method for glass glazing the surface of a body which method is comprised of preheating said body and bringing said body into a pressure contact with glass powder disposed on a flat base plate wherein said glass powder is disposed uniformly and in a given thickness upon said base plate.

These, and other objects of the instant invention will become apparent when reading the accompanying description and drawings in which.

Figure 1:
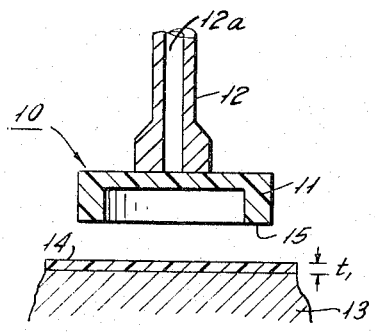
FIGURE 1 is a sectional view of a member and the apparatus for treating said member in accordance with the principles of the instant invention.

Referring, now, to the drawings, FIGURE 1 shows the apparatus 10 employed for glass glazing a cap member or open-ended housing 11 in accordance with the method of the instant invention. The cap member 11 is formed of a refractory insulating material such as ceramic. Cap member 11 is held by a vacuum chuck 12 having an axial opening 12a securing said cap member 11 to said chuck 12. A flat base plate 13 is stationed beneath said cap member 11. Glass powder 14 is spread over said base plate 13 to a uniform thickness $t_1$. Said cap member 11 is preheated to a predetermined temperature level. When said predetermined temperature level is achieved, said cap member 11 is moved vertically downward into contact with said glass powder 14. A force of sufficient magnitude is exerted upon said cap member 11 so as to provide a predetermined uniform contact pressure exerted upon said cap 11 which in turn exerts said contact pressure upon the glass powder 14.

The preheating of said cap member 11 causes said glass powder to be fused to glaze the surface 15 of said preheated cap member 11. The contact pressure acts to provide the glazed portion, which will be described with reference to FIGURE 3, with a predetermined thickness $T_1$.

Figure 2:
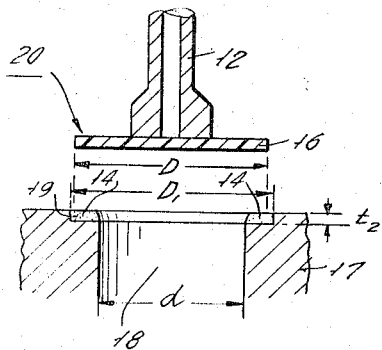
FIGURE 2 is a sectional view of another member and an alternative type of apparatus for treating said member in accordance with the method of the instant invention.

FIGURE 2 shows the apparatus 20 employed for glass glazing a lid member 16 which is employed for engaging said cap member 11 in a manner to be more fully described so as to hermetically seal a semiconductor device. Said lid member 16 is a ceramic disc and vacuum chuck 12 holds said lid member 16 at its center by suction. A base member 17 is positioned beneath said lid member or disc 16. Said base member 17 is provided with an opening 18 of a diameter $d$. The upper surface of said base member 17 is provided with a recess 19 of a diameter $D_1$. Said recess 19 is concentric with said opening 18. A layer of glass powder 14 is spread uniformly upon said recess 19 and is of a thickness $t_2$.

Said lid member 16 is preheated to a predetermined temperature level in the same manner as said cap member 11 of FIGURE 1, and is brought into a pressure contact with said layer of glass powder 14. The preheating of said lid member 16 causes said glass powder to be fused to glaze the periphery of the undersurface of said lid member 16. The pressure contact provides the glaze portion with a desired thickness. To facilitate the glazing operation, said diameter $D_1$ of said recess 19 is preferably made slightly larger than the diameter $D$ of said lid member 16.

In addition to the above steps, base plate 13 and base member 17 of FIGURES 1 and 2 respectively are preferably preheated to the temperature range of 200°–300° C. As a further step, the glazed portions of said cap member 11 or said lid member 16 may be heated up to the melting temperature of the glass so as to vitrify these glazed portions, which process makes sealing up of a semiconductor device easier in certain cases.

Figure 3:
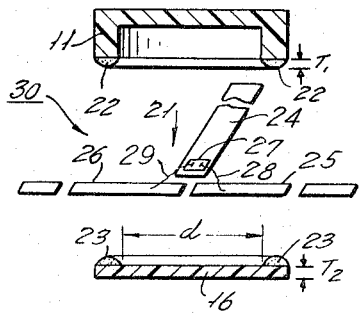
FIGURE 3 shows exploded sectional and bird's eye view of a semiconductor device and housing members therefore, the members of said housing having been treated in accordance with the method of the instant invention.

FIGURE 3 shows an exploded semiconductor assembly 30 comprised of a cap member 11, a disc member 16 and a mesa-type transistor member 21. Said member 11 has a glazed portion 22 of a thickness $T_1$ resulting from the glazing operation described with reference to FIGURE 1. Said lid member 16 is provided with a circular shaped glazed portion 23 of a thickness $T_2$, resulting from the glazing operation described with reference to FIGURE 2.

Figure 4:
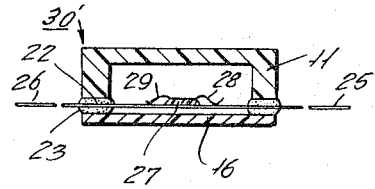
FIGURE 4 shows a sectional view of an assembled semiconductor device and a housing therefore of the type shown in the exploded view of FIGURE 3.

Said transistor member 21 is comprised of collector, emitter and base leads 24, 25 and 26, respectively. The transistor body 27 is secured to said collector lead 24 and is connected to said emitter and said base leads 25 and 26 respectively by internal connections 28 and 29. The transistor member 21 in which connections for said transistor body 27 is completed by the internal connections 28 and 29, is placed upon said lid member 16 and is then covered by said cap member 11 with said leads 24, 25 and 26 extending beyond the surface of the housing comprised of said cap member 11 and said lid member 16. This assembly brings said glazed portions 22 and 23 into a surface contact. The engaging glazed portions 22 and 23 are then fused together by heating to a sufficient temperature level to complete the hermetic seal for said semiconductor assembly 30 as shown in FIGURE 4: as designated by numeral 30'.

The glass glazing method of the instant invention can be simply performed, lends itself readily to mass production techniques and provides uniform glazed surfaces with relative ease by virtue of the fact that glazing is completed by bringing the portion of a body to be glazed into a pressure contact with a layer of glass powder of a uniform thickness disposed on a base member.

Although there have been described preferred embodiments of this novel invention, many variations and modifications will now be apparent to those skilled in the art. Therefore, this invention is to be limited, not by the specific disclosure herein, but only by the appended claims.

What is claimed is:
1. A method for glazing a body comprising the steps of:
providing a layer of glass powder upon a base member;
preheating said body to a predetermined temperature level sufficient to facilitate fusion of said glass powder;
and bringing said body into pressure contact with said layer of glass powder to produce a fused glass layer of predetermined thickness on said body.

2. A method for hermetically sealing a semiconductor body in a container comprising the steps of:
glazing a cup-shaped member along its marginal surface in accordance with the method of claim 1;
glazing a disc-shaped member along the periphery of one surface in accordance with the method of claim 1;
positioning said semiconductor body upon said disc member with the electrode leads of said semiconductor body extending beyond the periphery of said disc-shaped member;
positioning said cup-shaped member upon said disc-shaped member with the glazed surfaces of said members being in physical contact;
and heating said glazed surfaces to fuse them together.

3. The method of claim 1 wherein said layer of glass powder is spread to provide a uniform predetermined thickness.

4. The method of claim 1 wherein the step of providing a layer of glass powder upon said base member further comprises heating said base member to a predetermined temperature in the range from 200–300° C.

5. A method for encapsulating a body within an enclosure comprising the steps of:
(a) providing a two-piece enclosure wherein said two pieces each have mating surfaces to contact one another and fully enclose the interior region;
(b) providing a body having electrical leads extending therefrom and which may extend beyond the outer surface of the enclosure;
(c) providing a layer of uniform thickness of glass powder free of a binder upon a base member;
(d) preheating one of said enclosure pieces to a temperature sufficient to fuse said glass powder; moving the mating surface of said one enclosure piece into pressure contact with said glass powder;
(b) repeating step (d) for said other enclosure piece;
(f) placing said body between said enclosure pieces;
(g) joining and heating said mating surfaces to fuse said glazed surfaces with a portion of said leads extending beyond the outer surface of said enclosure.

References Cited by the Examiner

UNITED STATES PATENTS 2,894,359  7/1959  Pawlicki _____ 65—43 X
3,166,396  1/1965  Miller _____ 65—43 X

OTHER REFERENCES

Ser. No. 414,756, Long (A.P.C.), published April 1943.

JOHN F. CAMPBELL, *Primary Examiner.*

WHITMORE A. WILTZ, *Examiner.*

W. I. BROOKS, *Assistant Examiner.*